US005798159A

United States Patent [19]

Callahan, Jr. et al.

[11] Patent Number: 5,798,159

[45] Date of Patent: Aug. 25, 1998

[54] ADHESIVE SHEET PAD WITH CENTER TABBED LEADER STRIP

[75] Inventors: Joseph P. Callahan, Jr., St. Paul; Bruce E. Samuelson, West Lakeland Township, both of Minn.

[73] Assignee: Minnesota Mining and Manufacturing Company, St. Paul, Minn.

[21] Appl. No.: 649,310

[22] Filed: May 17, 1996

Related U.S. Application Data

[63] Continuation of Ser. No. 263,601, Jun. 21, 1994, Pat. No. 5,518,144.

[51] Int. Cl.[6] .......... B32B 7/00

[52] U.S. Cl. .......... 428/40.1; 221/45; 221/51; 221/63; 283/81; 428/41.7; 428/41.8; 428/41.9; 428/42.1; 428/42.2; 428/42.3; 428/212; 428/352; 428/354

[58] Field of Search .......... 428/40.1, 41.7, 428/41.8, 41.9, 42.1, 42.2, 42.3, 352, 354, 212; 283/81; 221/45, 51, 63

[56] References Cited

U.S. PATENT DOCUMENTS

| | | | |
|---|---|---|---|
| 4,416,392 | 11/1983 | Smith | 221/45 |
| 4,586,629 | 5/1986 | Loder | 221/46 |
| 4,586,631 | 5/1986 | Loder | 221/58 |
| 4,653,666 | 3/1987 | Mertens | 221/45 |
| 4,674,634 | 6/1987 | Wilson | 206/554 |
| 4,742,913 | 5/1988 | Emmel et al. | 206/460 |
| 4,768,810 | 9/1988 | Mertens | 282/12 A |
| 4,770,320 | 9/1988 | Miles et al. | 221/33 |
| 4,781,306 | 11/1988 | Smith | 221/33 |
| 4,907,825 | 3/1990 | Miles et al. | 281/51 |
| 4,986,440 | 1/1991 | Windorski | 221/45 |
| 4,993,590 | 2/1991 | Windorski | 221/46 |
| 5,050,909 | 9/1991 | Mertens et al. | 283/81 |
| 5,080,255 | 1/1992 | Windorski | 221/45 |
| 5,086,946 | 2/1992 | Blackwell et al. | 221/45 |
| 5,158,205 | 10/1992 | Bodziak et al. | 221/51 |
| 5,167,346 | 12/1992 | Bodziak | 221/63 |
| 5,401,547 | 3/1995 | Blackwell et al. | 428/40 |

FOREIGN PATENT DOCUMENTS

WO 95 35215 A 12/1995 WIPO .......... B42D 5/00

*Primary Examiner*—Nasser Ahmad

[57] ABSTRACT

A dispenser package including a stack of flexible sheets adhered together by layers of pressure sensitive adhesive with first and second ends of successive sheets in the stack adjacent; and an enclosure in which the stack of sheets is positioned having top wall portions with spaced opposed surfaces that define a wide slot. The first end portion of the uppermost sheet on the stack projects through the slot and rests against the adjacent first abutment surface. As that uppermost sheet is pulled through the slot, successive portions of it will peel away from the first underlying sheet in the stack until it contacts the second abutment surface, whereupon the first end portion of the first underlying sheet separates from the second underlying sheet, the first end portion of the first underlying sheet folds and moves through the slot with the second end portion of the uppermost sheet to leave, after the uppermost sheet is fully peeled from the first portion of the first underlying sheet, the first end portion of the first underlying sheet in a position projecting through the slot and resting against the second abutment surface in a position where it too may be grasped for manual removal in a similar manner.

4 Claims, 9 Drawing Sheets

ADHESIVE SHEET PAD WITH CENTER TABBED LEADER STRIP

This is a continuation of U.S. patent application Ser. No. 08/263,601, filed Jun. 21, 1994 now U.S. Pat. No. 5,518,144.

TECHNICAL FIELD

The present invention relates to dispenser packages for a plurality of flexible sheets each comprising a layer of pressure sensitive adhesive on a backing, which sheets have first and second ends and are adhered to each other in a stack with the first and second ends of successive sheets in the stack adjacent, and have first end portions adjacent their first ends that are not adhered to or can be easily separated from the underlying sheet in the stack to facilitate removal of the uppermost sheet in the stack.

BACKGROUND ART

Dispenser packages are known that include a plurality of flexible sheets each comprising a layer of pressure sensitive adhesive on a backing, which sheets have first and second ends and are adhered to each other in a stack with the first and second ends of successive sheets in the stack adjacent, and have first end portions adjacent their first ends that are not adhered to (or can be easily separated from) the underlying sheet in the stack to facilitate removal of the uppermost sheet in the stack. U.S. Pat. No. 5,086,946 describes such a package including such a stack of sheets in which the layers of pressure sensitive adhesive extend over the entire backings on the sheets, and the separation of the first end portions of the sheets is afforded by the use of release means for providing a first low adhesion level along the first end portion of each of the sheets between the layer of adhesive and the surface of the adjacent sheet in the stack to which the layer of adhesive is releasably adhered, and attachment means for providing a second adhesion level along a second end portion of each of the sheets adjacent their second ends between the layer of adhesive and the adjacent sheet in the stack that provides a release force that is higher than the low release force along the first end portion. U.S. Pat. No. 4,770,320 describes such a package including such a stack of sheets in which the layers of pressure sensitive adhesive extend over only a portion of the backings for the sheets. While each of the dispensing packages described in these U.S. patents is effective, both utilize shuttling of the stack to dispense the sheets.

DISCLOSURE OF INVENTION

The present invention provides a simple dispenser package for stacks of sheets of the types described above that does not require shuttling of the stack to dispense the sheets, thereby affording a reduced length for the dispenser package compared to dispenser packages in which the stack of sheets shuttles as sheets are dispensed.

The present invention provides a dispenser package that can include a stack of flexible sheets generally of the type described in U.S. Pat. No. 5,086,946, or generally of the type described in U.S. Pat. No. 4,770,320, each of which sheets has first and second ends and comprises a backing having a layer of pressure sensitive adhesive on a bottom surface by which the sheets are releasably adhered to each other in the stack with adjacent ends of the sheets aligned and with first and second ends of successive sheets in the stack adjacent. The sheets include either (1) release means for providing a first low adhesion level along a first end portion of each of the sheets adjacent its first end, which first adhesion level provides a low release force between the layer of adhesive and the adjacent top surface of a sheet to which the adhesive is releasably adhered, or (2) means for preventing adhesion of the first end portions of the sheets to underlying sheets in said stack; and attachment means for providing a second adhesion level along a second end portion of each of the sheets adjacent its second end between the layer of adhesive and the top surface of the adjacent sheet in the stack that provides a release force that is higher than the low release force (if any) along the first end portion and firmly adheres the sheet to the adjacent sheet in the stack while affording peeling the sheet from the stack along its second end portion. The first end portions of the sheets have lengths from the first ends toward the second ends of the sheets that are shorter than half the lengths of the sheets so that centered portions of the layers of pressure sensitive adhesive between the first end portions of successive sheets in the stack releasably adhere the sheets in surface to surface relationship in the stack.

The dispenser package includes an enclosure comprising walls defining a chamber in which the stack of sheets is positioned. Those walls include (1) a bottom wall defining a bottom side of the chamber, (2) two top wall portions defining a top side of the chamber opposite the bottom side and having, (either initially or after the package is opened) spaced opposed first and second abutment surfaces extending generally parallel to ends of the bottom wall, which abutment surfaces define a wide generally central transverse slot having a length between the abutment surfaces that is about equal to or greater than the length of the centered portions of the layers of pressure sensitive adhesive; and (3) side walls between the top wall portions and the bottom wall. The stack of sheets is positioned in the chamber with the ends of the sheets generally parallel to the ends of the bottom wall, and the lowermost sheet in the stack adjacent the bottom wall. The dispenser package includes means for restricting endwise movement of the stack relative to the housing and means for restricting flexing of the second end portions of all but the uppermost sheet in the stack around an axis parallel to the ends of the sheets in the stack (which means can be provided by adhering the lowermost sheet in the stack to the bottom wall or including a stiff support sheet within the chamber adjacent the bottom wall to which the lowermost sheet in the stack is adhered); and one of the abutment surfaces is disposed with respect to the uppermost sheet in the stack so that the first end portion of that uppermost sheet can project through the slot and rest against that one abutment surface. The length of the slot between the abutment surfaces affords, as the uppermost sheet is pulled through the slot by its first end portion, peeling of successive portions of the uppermost sheet from the first underlying sheet in the stack to which the uppermost sheet is adhered, and then separation of the first end portion of the first underlying sheet from the second underlying sheet, and movement of the first end portion of the first underlying sheet through the slot with the second end portion of the uppermost sheet to leave, after the uppermost sheet is fully peeled from the first portion of the first underlying sheet, the first end portion of the first underlying sheet in a position projecting through the slot and resting against the second abutment surface and disposed in a position where it may be grasped for manual removal in a manner similar to the removal of the uppermost sheet.

In some embodiments, the top wall portions and the side walls are spaced and disposed so that when the first end portion of the uppermost sheet projects through the slot and rests against the adjacent abutment surface, the part of that sheet between the stack and the first abutment surface is disposed at an angle in the range of about 80 to 135 degrees with respect to the second end portion of that uppermost sheet; whereas in one embodiment the part of that sheet between the stack and the first abutment surface may be disposed at an angle of up to about 175 degrees with respect to the second end portion of that uppermost sheet.

The top wall can further include a cover portion having ends releasably attached to the top wall portions and a part extending over the slot, which cover portion is manually engageable to afford its manual removal from the top wall portions to open the slot and afford manual removal of the sheets.

Also, the package can further including means for attaching the first end portion of the uppermost sheet to the cover portion so that the first end portion of the uppermost sheet on the stack is positioned against one of the abutment surfaces for subsequent removal upon removal of the cover portion from the housing.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
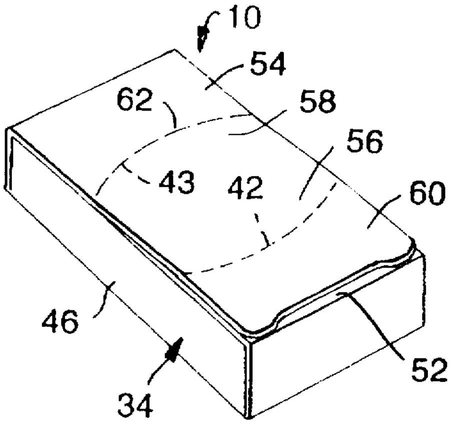
FIG. 1 is a perspective view of a first embodiment of a dispenser package according to the present invention in which the dispenser package is closed.
Figure 8:
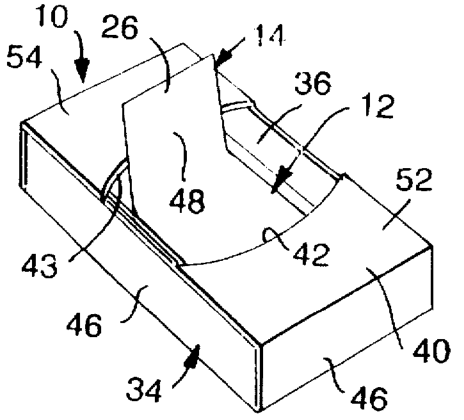
FIG. 8 is a perspective view of the dispenser package of FIG. 1 shown with a cover portion removed therefrom so that the dispenser package is open.

Referring now to FIGS. 1 through 8 of the drawing, there is shown in FIGS. 1 and 3 through 8 a first embodiment of a dispenser package according to the present invention generally designated by the reference numeral 10.

Figure 2:
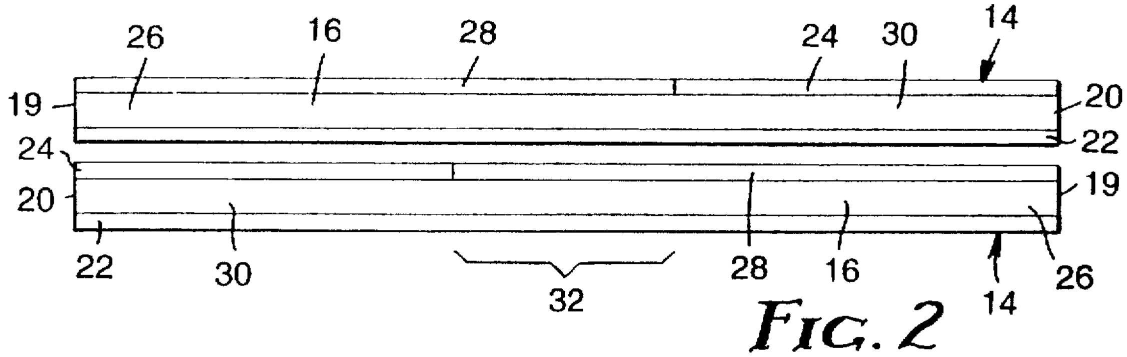
FIG. 2 is an enlarged side view of two of a plurality of sheets in a stack in the dispenser package of FIG. 1.

Generally the dispenser package 10 comprises a stack 12 of flexible sheets 14 of the type described in U.S. Pat. No. 5,086,946, the content whereof is incorporated herein by reference. FIG. 2 illustrates two of the sheets 14 from the stack 12 shown in FIGS. 3 through 8 with the sheets 14 aligned with respect to each other as they are on the stack 12 but slightly separated for clarity concerning the portions of the sheets 14. As is best seen in FIG. 2, each of the sheets 14 has first and second opposite ends 19 and 20 and a predetermined length between its first and second ends 19 and 20, and comprises a backing 16 (e.g., of transparent polymeric material) having opposite major top and bottom major surfaces, and a layer of pressure sensitive adhesive 22 (shown only in FIG. 2) on its bottom surface. The sheets 14 in the stack 12 are releasably adhered to each other by releasable adhesion of the layers of pressure sensitive adhesive 22 to the top surfaces of underlying sheets 14 to form the stack 12 with adjacent ends 19 or 20 of the sheets 14 aligned and with the first and second ends 19 and 20 of successive sheets 14 in the stack 12 adjacent. The sheets 14 have release means in the form of a first layer of release material 24, which on an underlying sheet 14 in the stack 12 provides a first adhesion level along a first end portion 26 of an overlying sheet 14 adjacent the first end 19 of its backing 16 between the layer of adhesive 22 and the top surface of the adjacent underlying sheet 14 in the stack 12 to which the layer of adhesive 22 is releasably adhered. This first adhesion level provides a sufficiently low release force between the layer of adhesive 22 and the adjacent underlying sheet 14 to which the adhesive 22 is releasably adhered to afford easy separation between the top and bottom surfaces of the adjacent sheets 14 along the first end portion 26 of the overlying sheet 14. Also the sheets 14 have attachment means in the form of a coating of a different release material 28 (shown only in FIG. 2) which on an underlying sheet 14 provides a second adhesion level along a second end portion 30 of an overlying sheet 14 adjacent the second end 20 of its backing 16 between the layer of adhesive 22 and the top surface of the adjacent sheet in the stack 12 to which the layer of adhesive 22 is releasably adhered. This second adhesion level provides a release force that is higher than the low release force along the first end portion 26 and firmly adheres the sheet 14 to the adjacent underlying sheet 14 in the stack 12 during separation of the sheet 14 relative to the adjacent sheet 14 along the first end portion 26 while affording peeling away of the sheet 14 from the stack 12 along the second end portion 30. The first end portions 26 have lengths from the first ends 19 toward the second ends 20 of the backings 16 that are shorter than half the predetermined lengths of the backings 16 so that centered portions 32 of the layers of pressure sensitive adhesive 22 between the first end portions 26 of successive sheets 14 in the stack 12 releasably adhere the sheets 14 in surface to surface relationship in the stack 12.

The dispensing package 10 also includes an enclosure 34 comprising walls (e.g., walls of 0.018 to 0.024 inch thick bending clay coated paperboard) defining a chamber 36 in which the stack 12 of sheets 14 is positioned. Those walls include a bottom wall 38 to an inner surface of which a lowermost sheet 14 on the stack 12 is adhered or otherwise fixed face to face along its full length to thereby provide means for restricting endwise movement of the stack 12 relative to the enclosure 34, and means for restricting flexing of the second end portions 30 of all but the uppermost sheet 14 in the stack 12 around an axis parallel to the ends of the sheets 14 in the stack 12; and a top wall 40 opposite the bottom wall 38 that, after the package 10 is opened as illustrated in FIGS. 3 through 8, has portions 52 and 54 with spaced opposed first and second abutment surfaces 42 and 43 that extend transverse to or across the length of the sheets and are slightly arcuate or cylindrically concave while being generally parallel to the ends 19 and 20 of the sheets 14. The abutment surfaces 42 and 43 help define a wide generally central transverse slot having a length between the abutment surfaces 42 and 43 that is about equal to or slightly greater than the length of the centered portions 32 of the layers of pressure sensitive adhesive 22. The walls also include spacing or side walls 46 between the top and bottom walls 40 and 38 that provide a space between the top wall 40 and the portion of the uppermost sheet 14 in the stack 12 adhered to the first underlying sheet 14 in the stack 12 (e.g., a space of at least 0.1875 inch or 0.476 centimeter normal to the top wall 40). The uppermost sheet 14 on the stack 12 is resiliently bent so that its first end portion 26 projects through the slot, rests against the adjacent first abutment surface 42, and, because of the relationship between the first abutment surface 42 and the end of the coating of release material 28 on the first underlying sheet 14 adjacent the second end 20 of the uppermost sheet 14, is disposed adjacent its first end 19 at an angle in the range of about 80 to 135 degrees (and preferably in the range of about 90 to 110 degrees) with respect to the second end portion 30 of the uppermost sheet 14 that is adhered to the first underlying sheet 14 in the stack 12. The length of the slot between the abutment surfaces 42 and 43 affords, as the uppermost sheet 14 is pulled through the slot at its first end portion 26, peeling of successive portions of the uppermost sheet 14 from the first underlying sheet 14 in the stack 12 to which the uppermost sheet 14 is adhered along the centered portions 32 of the layers of adhesive 22 (FIG. 4) until the uppermost sheet 14 contacts the second abutment surface 43 (FIG. 5), and then separation of the first end portion 26 of the first underlying sheet 14 from the second underlying sheet 14 as a result of tension in the second end portion 30 of the sheet extending around the second abutment surface 43, folding and movement of the first end portion 26 of the first underlying sheet 14 through the space between the stack 12 and the top wall 40 and through the slot with the second end portion 30 of the uppermost sheet (FIG. 6) to leave, after the uppermost sheet 14 is subsequently fully peeled from the first end portion 26 of the first underlying sheet 14 (FIGS. 7 and 8), the first underlying sheet 14 resiliently bent with its first end portion 26 in a position projecting through the slot, resting against the second abutment surface 43, and disposed adjacent its first end 19 at an angle in the range of about 80 to 135 degrees (and preferably in the range of about 90 to 110 degrees) with respect to the second end portion 30 of the first underlying sheet 14 that is adhered to the second underlying sheet 14 in the stack 12. The first end portion 26 resting against the adjacent first abutment surface 43 will project from the top wall 40 of the enclosure 34 and thus will be in a position where it too may be grasped for manual removal in a manner similar to the removal of the uppermost sheet 14. In that manner, subsequent underlying sheets 14 in the stack 12 may also be removed, each leaving the first end portion 26 of the next underlying sheet 14 in a position projecting from the enclosure 34 and supported against the opposite abutment surface 42 or 43 from that against which the sheet 14 removed was originally supported. The slight concavity of the abutment surfaces 42 and 43 causes a corresponding semi-cylindrical shape in the first end portions 26 of sheets 14 resting against them which imparts a measure of beam strength to those end portions 26, causing them to project above the top wall portions 52 and 54 of the enclosure 34.

Before the dispensing package 10 is opened (FIGS. 1 and 3), the top wall 40 includes the first and second portions 52 and 54 adjacent opposite ends of the stack 12 that respectively define the spaced opposed first and second abutment surfaces 42 and 43, a cover portion 56 having an attached end 58 releasably attached to the second portion 54 of the top wall 40, a part extending over the slot, and a manually engageable part 60 releasably attached to the surface of the first portion 52 opposite the chamber 36 with the part of the first end portion 26 of the uppermost sheet 14 projecting through the slot and past the first abutment surface 42 between the surface of the first portion 52 opposite the chamber and the manually engageable part 60. The cover portion 56 is manually removable from the top wall 40 by engaging its manually engageable part 60 and pulling it away from the top wall 40 to open the slot and afford manual removal of the sheets 14.

Figure 3:
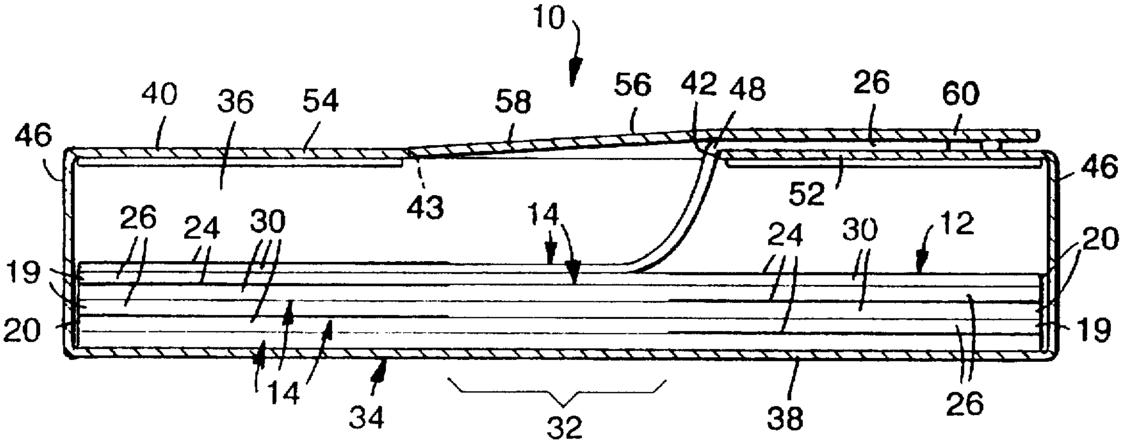
FIGS. 3 through 7 are enlarged sectional views of the dispenser package of FIG. 1 illustrating aspects of the stack of sheets housed therein and the sequential dispensing of sheets from that stack when the dispenser package is open.
Figure 4:
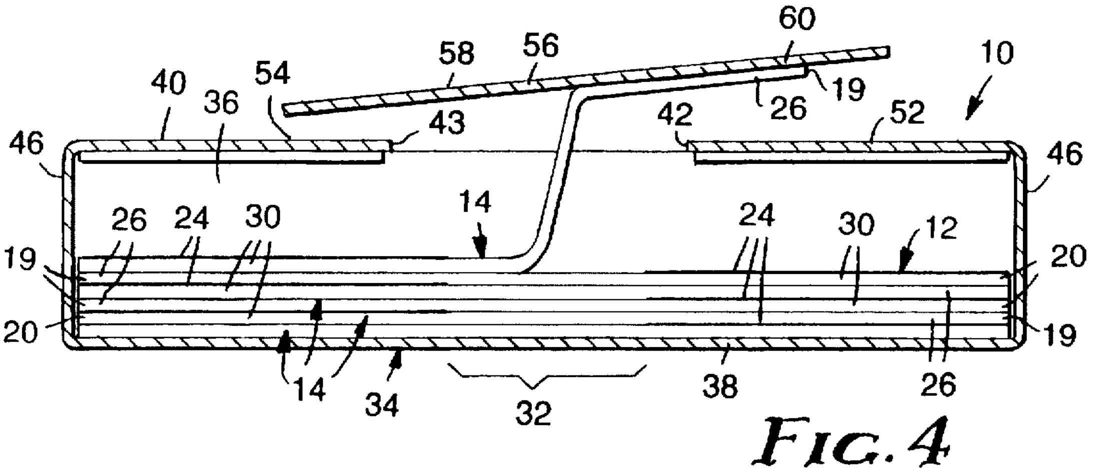
Figure 5:
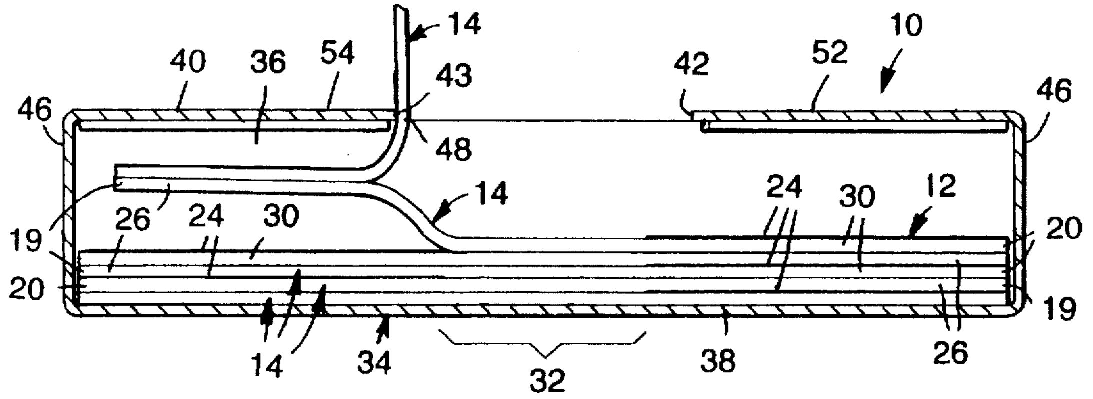
Figure 6:
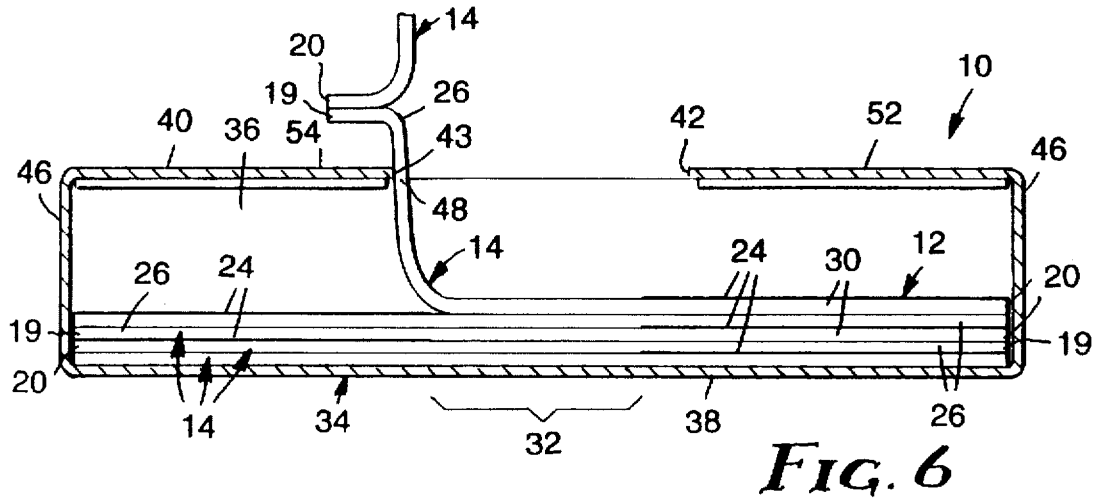
Figure 7:
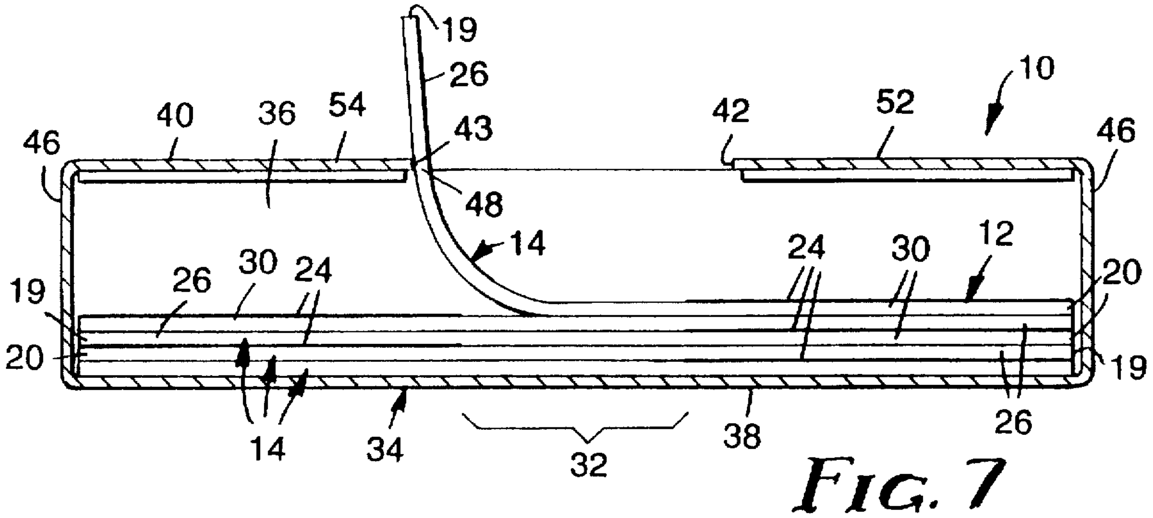

The part of the first end portion 26 of the uppermost sheet 14 projecting through the slot and past the first abutment surface 42 that is positioned between the surface of the first portion 52 opposite the chamber and the cover portion 56 can, as illustrated in FIGS. 3 and 4, be attached to the manually engageable part 60 of the cover portion 56 so that the uppermost sheet 14 is removed from the stack 12 upon removal of the cover portion 56 from the rest of the housing enclosure 34.

As illustrated, the cover portion 56 is formed from the same sheet of material as is the second portion 54 of the top wall 40, which sheet of material has perforations 62 (see FIG. 1) defining the second abutment surface 43 with the attached end 58 of the cover portion 56 releasably attached to the second portion 54 of the top wall 40 along the second abutment surface 43 by portions of the sheet of material between the perforations 62.

Figure 9:
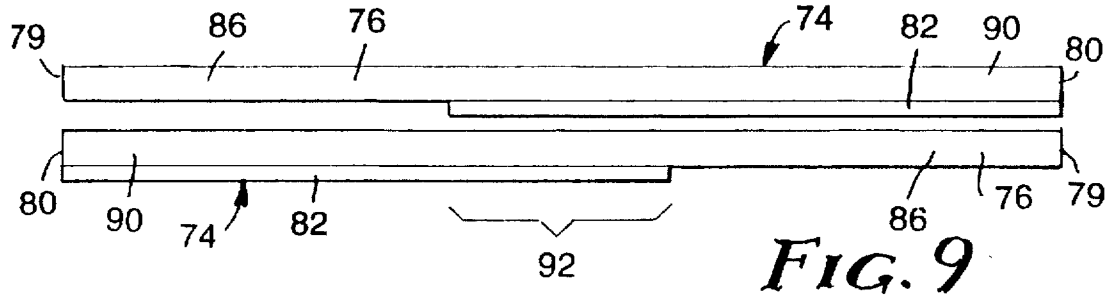
FIG. 9 is an enlarged side view of two of a plurality of sheets in a second embodiment of a dispenser package according to the present invention.
Figure 10:
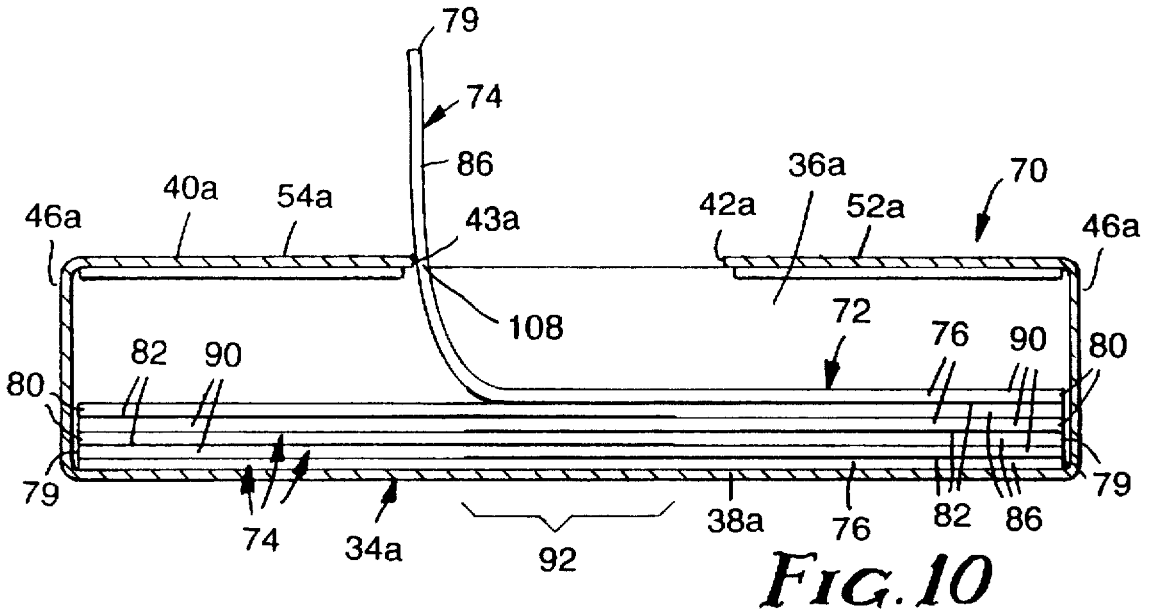
FIGS. 10 through 13 are enlarged fragmentary sectional views of the second embodiment of the dispenser package according to the present invention illustrating aspects of the stack of sheets housed therein and the sequential dispensing sheets from that stack.
Figure 11:
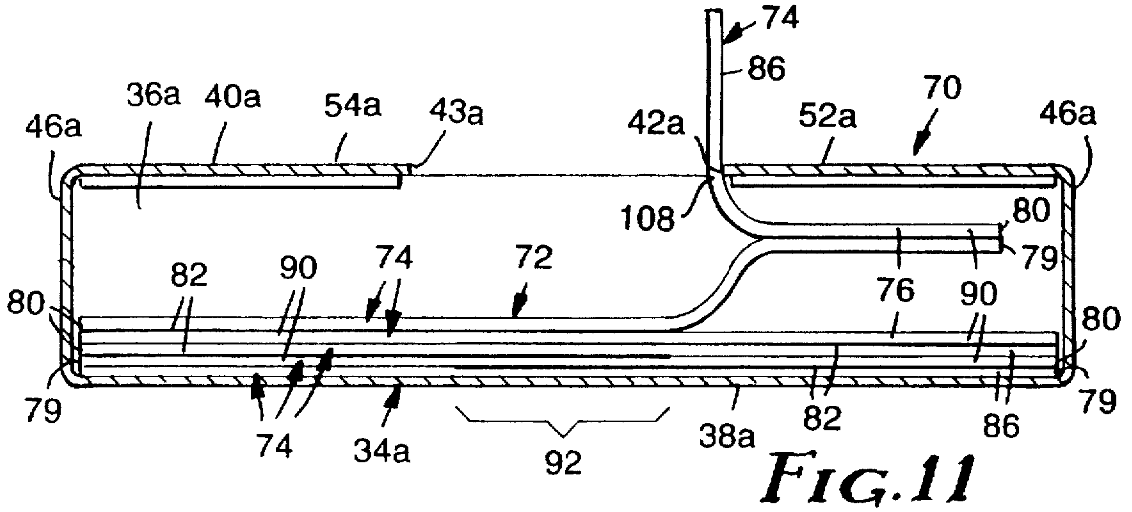
Figure 12:
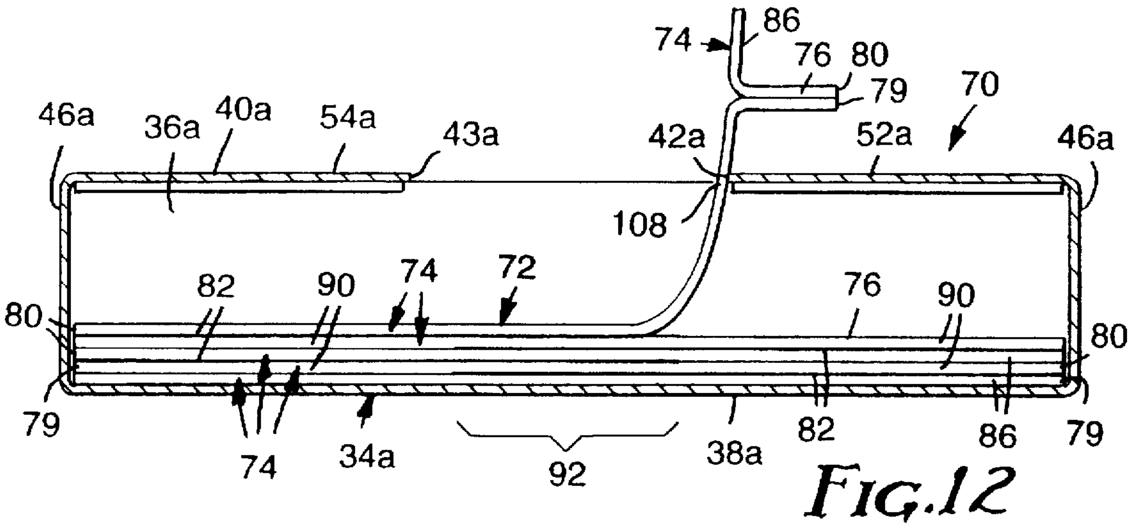
Figure 13:
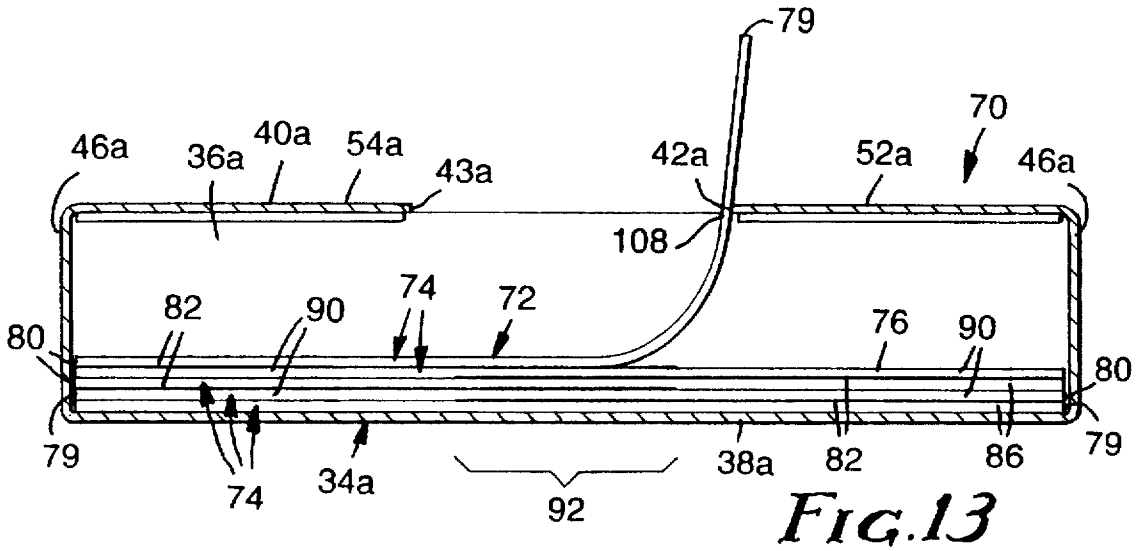

Referring now to FIGS. 9 through 13 of the drawing, there is shown in FIGS. 9 through 13 a second embodiment of a dispenser package according to the present invention generally designated by the reference numeral 70. The dispenser package 70 includes an enclosure **34*a* that is essentially the same as the enclosure 34 of the dispenser package 10, and has its parts identified with the same reference numerals to which has been added the suffix "a". Instead of the stack 12 of sheets 14, the dispenser package 70 includes a stack 72 of sheets 74 of the type described in U.S. Pat. No. 4,770,320, the content whereof is incorporated herein by reference. Generally, as is shown in FIG. 9 for two successive sheets 74 from the stack 72 (which sheets 74 are aligned with respect to each other as they are on the stack 72 but are slightly separated for clarity concerning the portions of the sheets 74), each of the sheets 74 comprises a backing 76 having opposite major top and bottom surfaces, first and second opposite ends 79 and 80, and a predetermined length between the first and second ends 79 and 80. Each of the sheets 74 includes a layer 82 of pressure sensitive adhesive on at least a second end portion 90 of the bottom surface adjacent the second end 80 of the backing 76, which second end portion 90 has a length from the second end 80 of the backing 76 toward its first end 79 that is longer than half the predetermined length of the backing 76. The sheets 74 in the stack 72 are releasably adhered to each other by adhesion of the layers of pressure sensitive adhesive 82 to portions of the top surfaces of underlying sheets 74 adjacent the first ends 79 of the underlying sheets 74 to form the stack 72 with adjacent ends 79 and 80 of the sheets 74 aligned and with the first and second ends 79 and 80 of successive sheets 74 in the stack 72 being adjacent. The sheets 74 include means for preventing adhesion of first end portions 86 of the sheets 74 adjacent their first ends 79 to underlying sheets 74 in the stack 72, which first end portions 86 have lengths from their first ends 79 toward their second ends 80 that are shorter than half their predetermined lengths so that centered portions 92 of the layers 82 of pressure sensitive adhesive between the first end portions 86 of successive sheets 74 in the stack 72 releasably adhere the sheets 74 in surface to surface relationship in the stack 72. In the sheets 74 illustrated, the pressure sensitive adhesive in the layers 82 is repositionable, and the first end portions 86 of the sheets 74 are free of adhesive on their bottom surfaces to provide that means for preventing adhesion of the first end portions of the sheets 74 adjacent their first ends 89 to an underlying sheet 74. Alternatively, the sheets could be coated with layers of pressure sensitive adhesive along their entire lengths and the means for preventing adhesion of the first end portions of the sheets adjacent their first ends to an underlying sheet could be provided either (1) by tabs permanently or removably adhered over the adhesive along their first end portions or (2) by coatings of release materials adjacent their first end portions on underlying sheets that prevented any adhesion of the adhesive on the first end portions of the sheets to the underlying sheets. As is seen in FIG. 10, the first end portion 86 of the uppermost sheet 74 on the stack 72 projects through the slot and rests against the adjacent second abutment surface 43a to dispose a part 108 of the first end portion 86 of the uppermost sheet 74 between the stack 72 and the second abutment surface 43a at an angle in the range of about 85 to 135 degrees with respect to the second end portion 90 of the uppermost sheet 74. The length of the slot between the abutment surfaces 42a and 43a affords, as the uppermost sheet 74 is pulled through the slot at its first end portion 86, peeling of successive portions of the uppermost sheet 74 from the first underlying sheet in the stack 72 to which the uppermost sheet 74 is adhered until the uppermost sheet 14 contacts the first abutment surface 42a (FIG. 11), and then separation of the first end portion 86 of the first underlying sheet 74 from the second underlying sheet 74, folding and movement of the first end portion 86 of the first underlying sheet 74 through the space between the stack 72 and the top wall 40a and through the slot with the second end portion 86 of the uppermost sheet (FIG. 12) to leave, after the uppermost sheet 74 is subsequently fully peeled from the first end portion 86 of the first underlying sheet 74 (FIG. 13), the first end portion 86 of the first underlying sheet 74 in a position projecting through the slot and resting against the first abutment surface 42a and disposed at an angle in the range of about 80 to 135 degrees with respect to the second end portion 90 of the first underlying sheet 74 in a position where it too may be grasped for manual removal in a manner similar to the removal of the uppermost sheet 74. In a similar manner, subsequent underlying sheets 74 in the stack 72 may also be removed, each leaving the first end portion 86 of the next underlying sheet 74 in a position projecting from the enclosure 34a and supported against the opposite abutment surface 42a or 43a from that against which the sheet 74** removed was originally supported.

Test Results

Experimental work was done to determine how the spacing between the abutment surfaces 42 and 43, the amount of space between the top wall 40 and the uppermost sheet 14 in the stack 12, and the width of the enclosure 34 effect the tension required to pull the uppermost sheet 14 in the stack 12 from the enclosure 34.

Over 80 enclosures were made of clay-coated newsback, 20 point caliper, paperboard. The enclosures were similar in shape to the enclosure 34 illustrated except that the abutment surfaces were planar and disposed at right angles to the side walls of the enclosures instead of being arcuate. The enclosures were made in four different sizes with seventeen different spacings between the abutment surfaces as is set out in Table 1 below, with more enclosures being made in sizes that, from previous experience, were expected to work well than were made in sizes that were not expected to work well.

Fifty stacks of sheets from the product presently sold by Minnesota Mining and Manufacturing Company under the trade designation "Pop-Up Magic Tape Pad" were obtained. The sheets in those stacks have polyester backings 16 that are 2.0 inches or 5 centimeters long, 0.75 inch or 1.9 centimeters wide and 0.163 inch or 0.41 centimeter thick and have first layers of release material 24 that are about 0.75 inch or 1.9 centimeters long so that the first end portions 26 of the sheets in the stack are about 0.75 inch or 1.9 centimeters long. Base polyester sheets that are normally positioned along the adhesive coating on the bottom most sheets in those stacks to facilitate shuttling movement of the stacks within enclosures were removed to expose the layers of adhesive along those bottom most sheets, and those layers of adhesive were adhered by hand to the bottom walls of the enclosures using a 4.8 pound Peacock roller rolled twice over the stacks of sheets at a constant rate, and with the lengths and widths of the stacks of sheets centered with respect to the lengths and widths of the bottom walls of the enclosures and with the lengths of the stacks of sheets centered with respect to the abutment surfaces. The resultant sample dispenser packages were allowed to pre-condition for 24 hours at 70 F., 50% R.H. before testing. Individual dispenser packages were each securely mounted to a floating horizontal steel platen using a 3M double-coated foam tape. A clip connected to a calibrated Chatillon Digital Force Gage which measured force in grams was attached to the end portion of the uppermost sheet in the stack that rested against the adjacent abutment surface and projected above the top wall of the enclosure, and the platen was dropped by the operator in a controlled manner. Over 2,000 sheets were pulled from the sample dispenser packages. The resultant force measurements for the various dispenser packages are recorded below in table I.

TABLE 1 sizes in inches, force in grams:

| Housing (w × d) | Orifice Length | Pull Force | STD.DEV. |
|---|---|---|---|
| 1-1/4 × 7/16 | 1-1/4 | 177 | 14 |
| 1-1/4 × 1/4 | 1 | 179 | 14.6 |
| 1-1/4 × 7/16 | 1 | 186 | 16 |
| 1-1/4 × 7/16 | 1-1/2 | 188 | 16.2 |
| 7/8 × 1/4 | 3/4 | 223 | 28.3 |
| 1-1/4 × 7/16 | 3/4 | 225 | 17.3 |
| 1-1/4 × 1/4 | 3/4 | 236 | 22.8 |

TABLE 1-continued

| sizes in inches, force in grams: | | | |
|---|---|---|---|
| Housing (w × d) | Orifice Length | Pull Force | STD.DEV. |
| 7/8 × 7/16 | 1 | 256 | 51 |
| 7/8 × 1/4 | 1/2 | 277 | 62.3 |
| 1-1/4 × 1/4 | 1/2 | 283 | 46.3 |
| 1-1/4 × 7/16 | 1/2 | 317 | 55 |
| 1-1/4 × 7/16 | 7/16 | 333 | 71 |
| 1-1/4 × 1/4 | 7/16 | 339 | 64.7 |
| 1-1/4 × 7/16 | 5/16 | 367 | 136 |
| 1-1/4 × 7/16 | 1/2 | 367 | 139 |
| 7/8 × 7/16 | 7/16 | 373 | 130 |
| 7/8 × 1/4 | 7/16 | 379 | 117.6 |

Pull force measurements of 250 grams or less were considered desirable. Pull force measurements above 250 grams were encountered when the orifice length or space between the abutment surfaces 42 and 43 was 0.5 inch or less (which was about equal to or less than the length of the centered portions 32 of the layers of adhesive 22), regardless of the width (⅞ inch or 1-¼ inch) or depth of the enclosure, and with such orifice lengths the top walls of some enclosures were torn and on some occasions a second sheet came out of the enclosure with the sheet being pulled from the enclosure.

The tests suggested;

(1) that the spacing between the abutment surfaces 42 and 43 is the most significant factor determining the amount of force required to pull the uppermost sheet 14 from the stack 12. For the test dispenser packages a length greater than ½ inch between the abutment surfaces 42 and 43 was desirable. Although the lowest pull force results were obtained from dispenser packages with distances between the abutment surfaces 42 and 43 of 1-¼ inch, such dispenser packages were not the most desirable because their enclosures had little top wall and thus less structural integrity than is desired in a paperboard enclosure. Dispenser packages with distances between the abutment surfaces 42 and 43 of greater than ½ inch and less than 1 inch were thus preferred for their combination of easy dispensing and structural integrity.

(2) the width of the enclosure only had an effect in dispenser packages in which the distance between the abutment surfaces 42 and 43 was ½ inch or less. In such dispenser packages the dispensing force was less with wider enclosures, apparently because the wider width lessened the beam strength of the top wall portions, and allowed them to flex and thereby lessened the force required to dispense sheets. For enclosures with distances between the abutment surfaces 42 and 43 of over ½ inch the width of the enclosure had no significant effect on dispensing force.

(3) the depth of the enclosure only had a significant effect in dispenser packages in which the distance between the abutment surfaces 42 and 43 was ½ inch or less. In such dispenser packages the dispensing force was less with deeper enclosures, apparently because the greater depth provided more space between the top of the stack of sheets and the top wall portions, which space is apparently then needed for a curl to form in the sheet below the sheet being withdrawn as it is peeled from the underlying sheet while it moves through that space between the top wall 40 and the uppermost sheet 14 on the stack 12. For enclosures with distances between the abutment surfaces 42 and 43 of over ½ inch the depth of the dispenser package had no significant effect on dispensing force, however a fairly large space between the top of the stack of sheets and the top wall is still desirable (e.g., 3/16 inch for the example dispensing packages) to insure that unexpected defects in the stack will not fill that space, and so that tight manufacturing tolerances will not be needed. That spacing, however, should not be so great as to restrict the amounts of the end portions of the sheets that project from the top wall of the enclosure.

Further Embodiments

Figure 14:
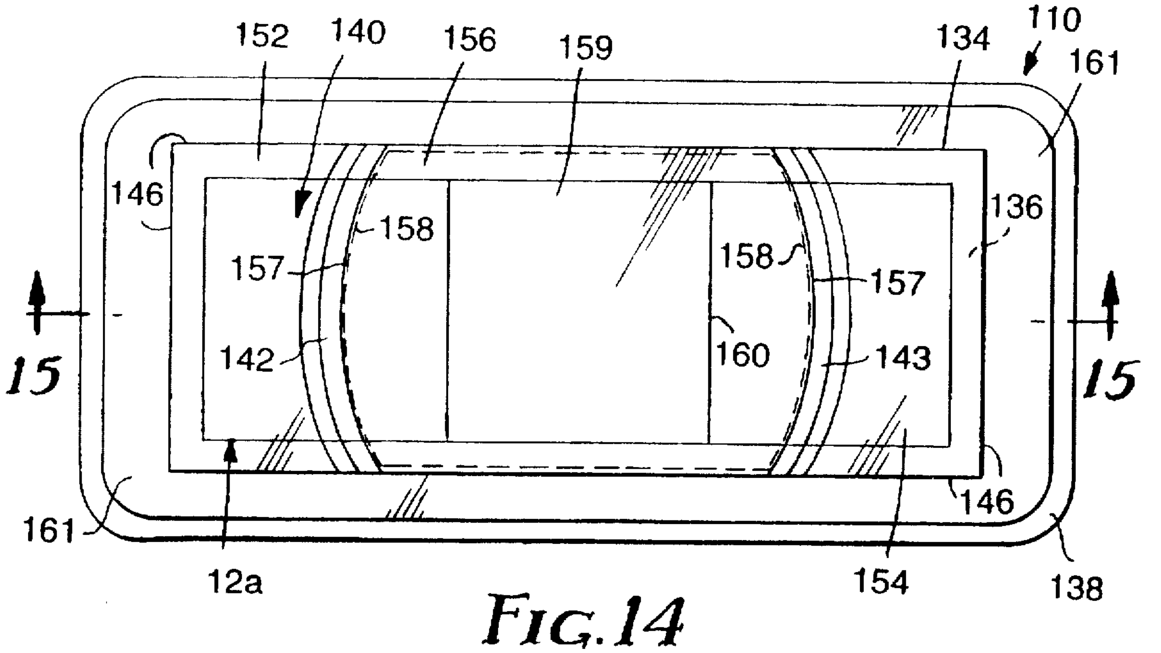
FIG. 14 is an enlarged top view of a third embodiment of a dispenser package according to the present invention in which the dispenser package is closed.
Figure 15:
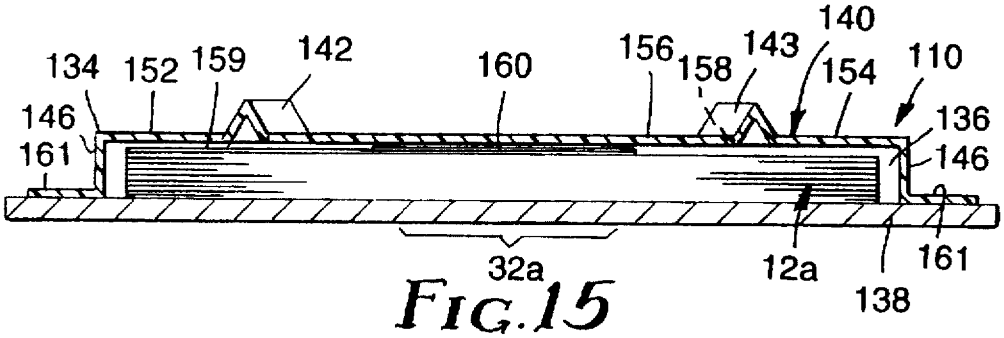
FIG. 15 is a sectional view taken approximately along line 15—15 of FIG. 16.
Figure 16:
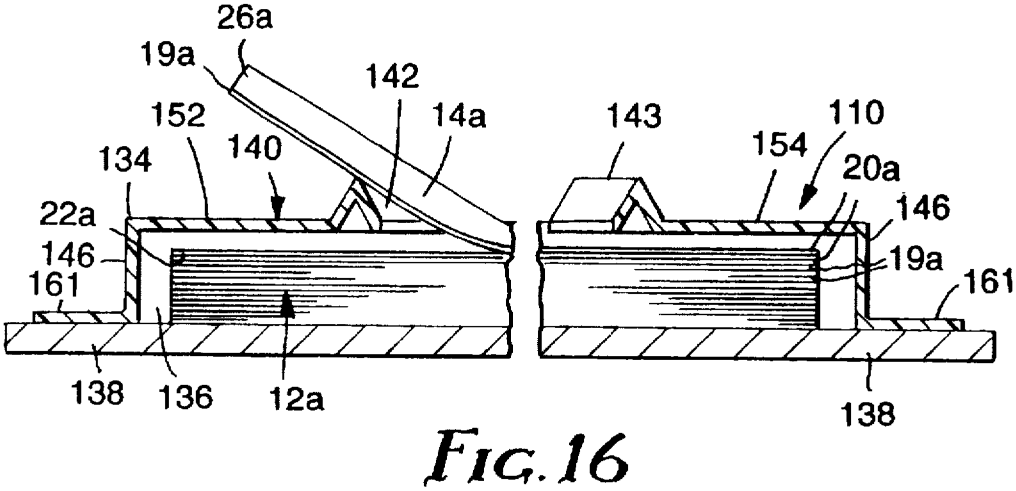
FIG. 16 is an enlarged fragmentary sectional view similar to FIG. 15, but showing the dispenser package after it has been opened.

Referring now to FIGS. 14 through 16 of the drawing, there is shown a third embodiment of a dispenser package according to the present invention generally designated by the reference numeral 110. The dispenser package 110 includes a stack **12*a* of sheets 14*a* that is essentially the same as the stack 12 of sheets 14 of the dispenser package 10 described above, and has its parts (some of which are not identified in FIGS. 14 through 16, but can be understood by referring to the above description of the stack 12 in the dispenser package 10**) identified by reference numerals with the same reference numerals to which has been added the suffix "a".

Generally, in addition to the stack **12*a* of sheets 14*a*, the dispenser package 110 also includes an enclosure 134 comprising walls defining a chamber 136 in which the stack 12*a* of sheets 14*a* is positioned. Those walls include a bottom wall 138 (e.g., of 0.026 inch thick cardboard) to an inner surface of which a lowermost sheet 14*a* on the stack 12*a* is adhered or otherwise fixed face to face along its full length to thereby provide means for restricting endwise movement of the stack 12*a* relative to the enclosure 134 and means for restricting flexing of the second end portions of all but the uppermost sheet 14*a* in the stack 12*a* around an axis parallel to the ends of the sheets 14*a* in the stack 12*a*; and a top wall 140 opposite the bottom wall 138. The top wall 140 has end portions including parts 152 and 154 that are generally parallel to the bottom wall 138 and parts projecting above the end parts 152 and 154 that define spaced opposed first and second abutment surfaces 142 and 143 that extend transverse to or across the length of the sheets and are slightly arcuate or cylindrically concave while being generally parallel to the ends 19*a* and 20*a* of the sheets 14*a*. After the package 110 is opened as illustrated in FIG. 16 and described below, the abutment surfaces 142 and 143 help define a wide generally central transverse slot having a length between the abutment surfaces 142 and 143 that is about equal to or slightly greater than the length of the centered portions 32*a* of the layers of pressure sensitive adhesive on the sheets 14*a*. The walls also include spacing or side walls 146 between the top and bottom walls 140 and 138. The side walls 146 provide a space between the top wall 140 and the portion of the uppermost sheet 14*a* in the stack 12*a* adhered to the first underlying sheet 14*a* in the stack 12*a*. Because the abutment surfaces 142 and 143 project above the end parts 152 and 154 of the top wall 140, the side walls 146 do not need to provide the space between the end parts 152 and 154 of the top wall 140 and the portion of the uppermost sheet 14*a* in the stack 12*a* adhered to the first underlying sheet 14*a* in the stack 12*a* that is preferably provided in the dispenser packages 10 and 70** described above.

After the dispenser package 110 has been opened as described below, the uppermost sheet **14*a* on the stack 12*a* is resiliently bent so that its first end portion 26*a* projects through the slot, rests against the adjacent first abutment surface 142, and, because of the relationship between the first abutment surface 142 and the end of the coating of release material on the first underlying sheet 14*a* adjacent the second end 20*a* of the uppermost sheet 14*a*, is disposed adjacent its first end 19*a* at an angle in the range of about 80 to 135 degrees (and preferably in the range of about 90 to 110 degrees) with respect to the second end portion 30a of the uppermost sheet 14a that is adhered to the first underlying sheet 14a in the stack 12a. The length of the slot between the abutment surfaces 142 and 143 affords, as the uppermost sheet 14a is pulled through the slot at its first end portion 26a, peeling of successive portions of the uppermost sheet 14a from the first underlying sheet in the stack 12a to which the uppermost sheet 14a is adhered along the centered portions 32a of the layers of adhesive until the uppermost sheet 14a contacts the second abutment surface 143, and then separation of the first end portion 26a of the first underlying sheet 14a from the second underlying sheet 14a as a result of tension in the second end portion 26a of the sheet extending around the second abutment surface 143, folding and movement of the first end portion 26a of the first underlying sheet 14a through the space between the stack 12a and the top wall 140 and through the slot with the second end portion of the uppermost sheet to leave, after the uppermost sheet 14a is subsequently fully peeled from the first end portion 26a of the first underlying sheet 14a, the first underlying sheet 14a resiliently bent with its first end portion 26a in a position projecting through the slot, resting against the second abutment surface 143, and disposed adjacent its first end 19a at an angle in the range of about 80 to 135 degrees (and preferably in the range of about 90 to 110 degrees) with respect to the second end portion of the first underlying sheet 14a that is adhered to the second underlying sheet 14a in the stack 12a. The first end portion 26a resting against the adjacent first abutment surface 143 will then project from the top wall 140 of the enclosure 134 and thus will be in a position where it too may be grasped for manual removal in a manner similar to the removal of the uppermost sheet 14a. In that manner, subsequent underlying sheets 14a in the stack 12a may also be removed, each leaving the first end portion 26a of the next underlying sheet 14a in a position projecting from the enclosure 134 and supported against the opposite abutment surface 142 or 143 from that against which the sheet 14a** removed was originally supported.

Before the dispensing package 110 is opened (FIGS. 14 and 15), its top wall 140 includes the end portions that include the first and second parts 152 and 154 adjacent opposite ends of the stack 12a and the upwardly projecting parts that define the spaced opposed first and second abutment surfaces 142 and 143, and a cover portion 156 having opposite attached ends 157 releasably attached along a line 158 of weakness or perforations) to the end portions. The cover portion 156 extends over the slot and is manually engageable along its edges which are spaced from and are not attached to the side walls 146 of the dispensing package 110. The cover portion 156 is manually removable from the end portions of the top wall 140 by engaging it along its edges that extend between its attached ends 157 and peeling it from between the end portions along the lines 158 of weakness or perforations to open the slot and afford manual removal of the sheets 14a.

Means are provided that are used during opening of the dispenser package 110 for pulling the first end portion 26a of the uppermost sheet 14a on the stack 12a through the slot and past the first abutment surface 142 so that the first end portion 26a of that uppermost sheet 14a can be engaged to manually pull that uppermost sheet 14a from the dispenser package 110. A leader 159, similar in shape to the sheets 14a but only about half their lengths is adhered along the first end portion 26a of the uppermost sheet 14a on the stack 12a. The leader 159 terminates below the cover portion 156 and has a brightly colored tab 160 on its end. After a person manually removes the cover portion 156, he can manually grab that tab 160 and pull the leader 159 through the slot, whereupon the leader 159 will simultaneously pull the first end portion 26a of the uppermost sheet 14a through the slot in the manner described above by which one sheet 14a pulls another through the slot and can be pealed away, leaving the first end portion 26a of the uppermost sheet 14a on the stack 12a projecting through the slot and resting against the first abutment surface 142 as is illustrated in FIG. 16. Alternatively, the leader 159 can be attached to the manually removable cover portion 156 so that the uppermost sheet 14a is pulled to the position described above upon removal of the cover portion 156 from the rest of the housing enclosure 134.

As illustrated, the top wall 140, the four rectangularly disposed side walls 146 and an outwardly projecting flange 161 on the side of the side walls 146 opposite the top wall that is adhered to the bottom wall 138 are vacuum formed from the same sheet of polymeric material (e.g., transparent 0.0067 inch thick polyester) which sheet of material has curved upwardly projecting ridges with semi-circular cross sections along the lines of weakness that define the slightly arcuate or cylindrically concave first and second abutment surfaces 142 and 143.

Figure 17:
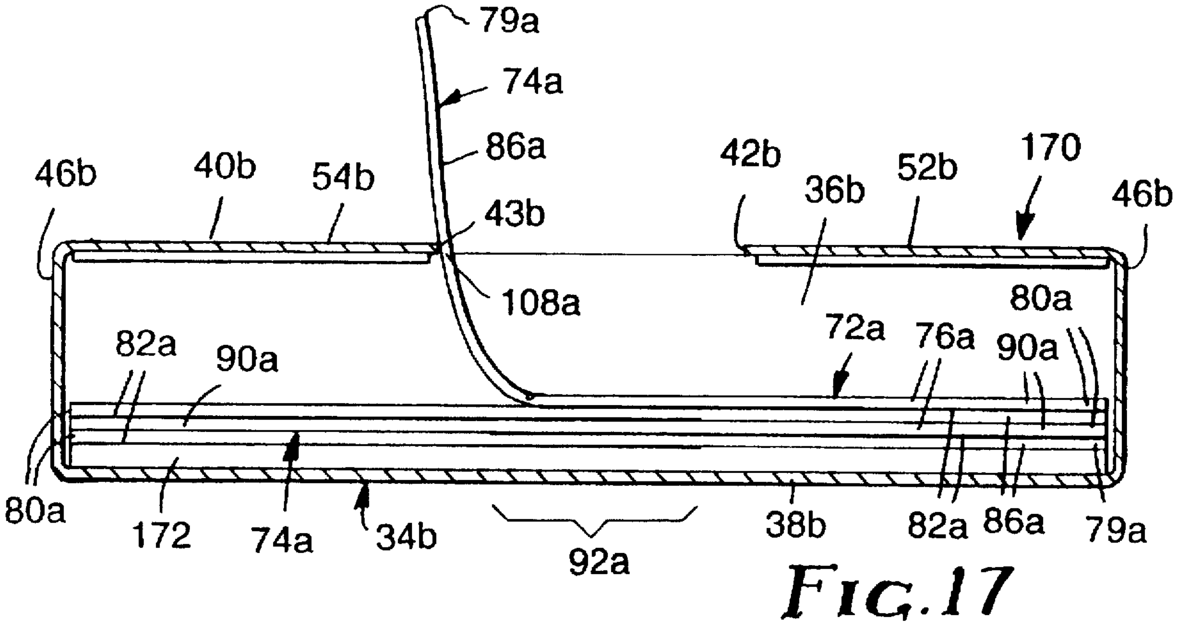
FIG. 17 is a sectional view of a fourth embodiment of a dispenser package according to the present invention.

Referring now to FIG. 17 of the drawing, there is shown a fourth embodiment of a dispenser package according to the present invention generally designated by the reference numeral 170.

The dispenser package 170 includes a stack 72a of sheets 74a that is the same as the stack 72 of sheets 74 of the dispenser package 70 described above, and has its parts identified with the same reference numerals to which has been added the suffix "a". The dispenser package 170 also includes an enclosure 34b that is the same as the enclosure 34 described above, and has its parts identified with the same reference numerals to which has been added the suffix "b". The dispenser package 170 only differs from the dispenser package 70 in that the lowermost sheet 74a on the stack 72a is adhered or otherwise fixed face to face along its full length to a stiff support sheet 172 (e.g., of paperboard or polymeric material) within the chamber 36b adjacent the bottom wall 38b that is not attached to the bottom wall 38b, but has opposite ends at the ends of the bottom wall 38b. That support sheet 172 provides both means for restricting endwise movement of the stack 72a relative to the enclosure 34b and means for restricting flexing of the second end portions 90a of all but the uppermost sheet 74a in the stack 72a around an axis parallel to the ends of the sheets 74a in the stack 72a. A support sheet similar to the support sheet 172 could optionally be used in any of the embodiments of dispenser packages described herein in which adhering or otherwise fixing the lowermost sheet on the stack to the bottom wall is not required to retain the stack in the enclosure.

Figure 18:
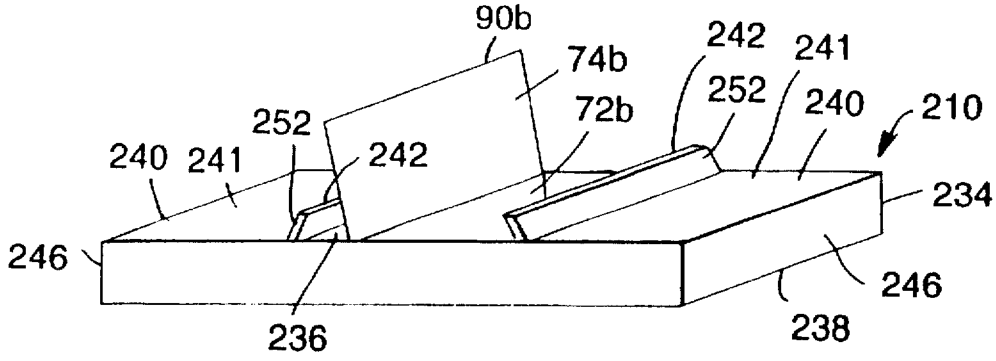
FIG. 18 is perspective view of a fifth embodiment of a dispenser package according to the present invention in which the dispenser package is open.
Figure 19:
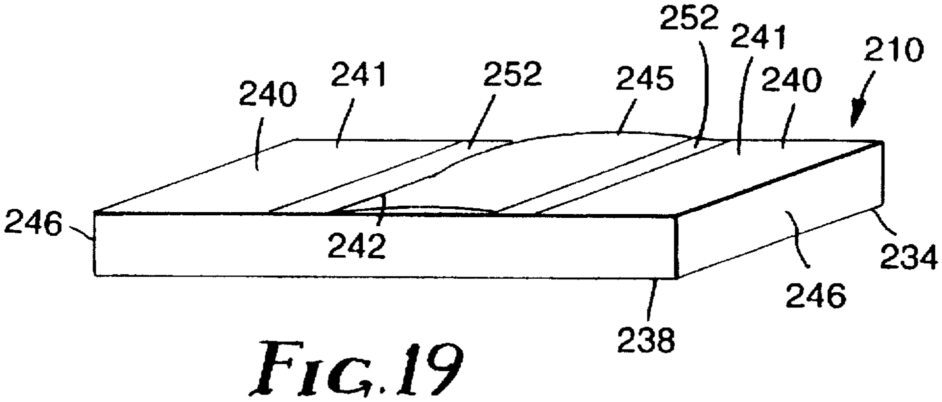
FIG. 19 is perspective view of the dispenser package of FIG. 18 in which the dispenser package is closed.

Referring now to FIGS. 18 and 19 of the drawing, there is shown a fifth embodiment of a dispenser package according to the present invention generally designated by the reference numeral 210.

The dispenser package 210 includes a stack 72b of sheets 74b that is generally the same (except as noted below) as the stack 72 of sheets 74 of the dispenser package 70 described above, and has its parts (some of which are not identified in FIGS. 18 and 19, but can be understood by referring to the above description of the dispenser package 70) identified with the same reference numerals to which has been added the suffix "b".

Generally, in addition to the stack 72b of sheets 74b, the dispenser package 210 also includes an enclosure 234 comprising walls defining a chamber 236 in which the stack 72b of sheets 74b is positioned. Those walls are made of a single folded sheet of pasteboard and include a bottom wall 238 adjacent the lowermost sheet 74b in the stack 72b, and top wall portions 240 opposite the bottom wall 238 that have parts 241 parallel to the bottom wall 238, and adjacent opposed spaced upturned top wall parts 252 with spaced opposed first and second abutment surfaces 242 that are straight and extend transverse to or across the sheets generally parallel to the ends 79b and 80b of the sheets 74b. The lowermost sheet 74b on the stack 72b is adhered or otherwise fixed face to face along its full length to the bottom wall 238 of the enclosure 234 to provide both means for restricting endwise movement of the stack 72b relative to the enclosure 234 and means for restricting flexing of the second end portions 90b of all but the uppermost sheet 74b in the stack 72b around an axis parallel to the ends of the sheets 74b in the stack 72b. The abutment surfaces 242 help define a wide generally central transverse slot having a length between the abutment surfaces 242 that is about equal to or slightly greater than the length of the centered portions 92b of the layers 82b of pressure sensitive adhesive. The walls also include four rectangularly disposed spacing or side walls 246 between the bottom wall 238 and the top wall portions 240. Because the upturned top wall parts 252 position the abutment surfaces 242 above the end parts 241 of the top wall portions 240, the side walls 246 do not need to provide the space between the end parts 241 of the top wall portions 240 and the portion of the uppermost sheet 74b in the stack 72b adhered to the first underlying sheet 74b in the stack 72b that is preferably provided in the dispenser packages 10 and 70 described above. The uppermost sheet 74b on the stack 72b is resiliently bent so that its first end portion 86b projects through the slot, rests against the adjacent abutment surface 242, and, because of the relationship between that abutment surface 242 on the upturned top wall portion 252 and the adjacent end of the coating of pressure sensitive adhesive 82b on the uppermost sheet 74b, is disposed adjacent its first end 79b at an angle in the range of about 80 to 135 degrees (and preferably in the range of about 90 to 110 degrees) with respect to the second end portion 90b of the uppermost sheet 74b that is adhered to the first underlying sheet 74b in the stack 72b. The dispenser package 210 than affords dispensing of sheets 74b in the manner described above for the other dispenser packages.

The sheets 74b in the stack 72b dispensed by the dispenser package 210 differ from the sheets described in U.S. Pat. No. 4,770,320 in that they have a greater width to length ratio (e.g., 2.75 inches long by 2 inches wide or 2 inches square) than the sheets described in U.S. Pat. No. 4,770,320; their backings are of 0.0018 inch thick material of the type described in U.S. Pat. No. 4,908,278 (the content whereof is incorporated herein by reference); their first end portions 86b that are free of adhesive are transparent and are not particularly visually distinctive with respect to their adhesive coated second end portions 90b in that they are not colored; and the layers 82b of repositionable adhesive used on them are adhesive of the type described in European Patent No. EP0439,941-A1, the content whereof is incorporated herein by reference. This structure makes the sheets 74b useful for purposes often served by lengths of adhesive coated tape or thumb tacks such as adhering large sheets (i.e., sheets that have been removed from easel boards used in brain storming sessions) to wall surface.

Prior to use, the dispenser package 210 can be disposed as is illustrated in FIG. 19 with its top wall parts 252 that define the abutment surfaces 242 laying parallel with the top wall parts 241, and a tab 245 adhering the projecting first end portion 86b of the uppermost sheet 74b in the stack 72b along the outer surface of one of the top wall portions 240. To open the dispenser package 210, the tab 245 is peeled away and the top all parts 252 are folded upwardly so that they project above the end wall parts 241.

Figure 21:
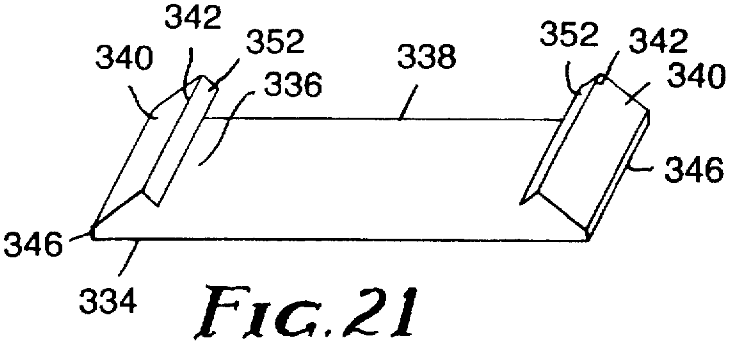
FIG. 21 is a perspective view of an enclosure included in the dispenser package of FIG. 20.
Figure 20:
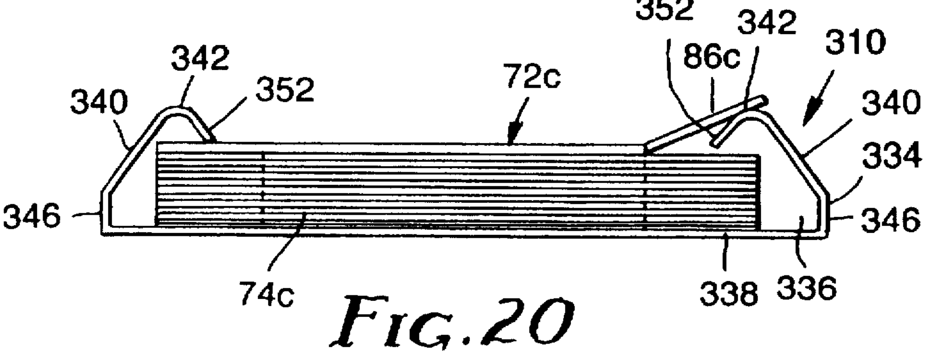
FIG. 20 is a side view of sixth embodiment of a dispenser package according to the present invention.

Referring now to FIGS. 20 and 21 of the drawing, there is shown a sixth embodiment of a dispenser package according to the present invention generally designated by the reference numeral 310.

The dispenser package 310 includes a stack 72c of sheets 74c that is generally the same as the stack 72b of sheets 74b of the dispenser package 210 described above, and has its parts (some of which are not identified in FIGS. 20 and 21, but can be understood by referring to the above description of the dispenser package 210) identified with the same reference numerals to which has been added the suffix "c".

In addition to the stack 72c of sheets 74c, the dispenser package 310 includes an enclosure 334 (illustrated in FIG. 21 without the stack 72c of sheets 74c). The enclosure comprises stiff walls (e.g., of polymeric material or metal) defining a chamber 336 in which the stack 72c of sheets 74c is positioned. Those walls (which could be formed by an extrusion or metal bending process) include a bottom wall 338 to an inner surface of which a lowermost sheet 74c on the stack 72c is adhered or otherwise fixed face to face along its full length to thereby provide means for restricting endwise movement of the stack 72c relative to the enclosure 334 and means for restricting flexing of the second end portions 90c of all but the uppermost sheet 74c in the stack 72c around an axis parallel to the ends of the sheets 74c in the stack 72c; and top wall portions 340 opposite the bottom wall 338 that have spaced down turned parts 352 with spaced opposed abutment surfaces 342 that are straight and extend transverse to or across the length of the sheets 74c generally parallel to the ends 79c and 80c of the sheets 74c. The abutment surfaces 342 help define a wide generally central transverse slot having a length between the abutment surfaces 342 that is greater than the length of the centered portions 92c of the layers 82c of pressure sensitive adhesive. The walls also include spacing or side walls 346 between the bottom walls 338 and the top wall portions 340 disposed at opposite ends of the bottom wall 338. The side walls 346 provide a space between the top wall portions 340 and the portion of the uppermost sheet 74c in the stack 72c adhered to the first underlying sheet 74c in the stack 72c in that it does not restrict free movement of that uppermost sheet 74c from beneath the top wall portions 340, however, space such as is provided in the dispenser packages 10 and 70 described above is not needed because the slot has a length between the abutment surfaces 342 that is greater than the length of the centered portions 92c of the layers 82c of pressure sensitive adhesive. The uppermost sheet 74c on the stack 72c is resiliently bent so that its first end portion 86c projects through the slot, rests against the adjacent abutment surface 342 which projects above the stack 72c, and, because of the relationship between the first abutment surface 342 and the end of the coating of pressure sensitive adhesive 82c on the uppermost sheet 74c is disposed adjacent its first end 79c at an angle in the range of about 80 to 135 degrees (and preferably in the range of about 90 to 110 degrees) with respect to the second end portion 90c of the uppermost sheet 74c that is adhered to the first underlying sheet 74c in the stack 72c. The dispenser package 310 than affords dispensing of sheets 74c in the manner described above for the other dispenser packages.

Figure 22:
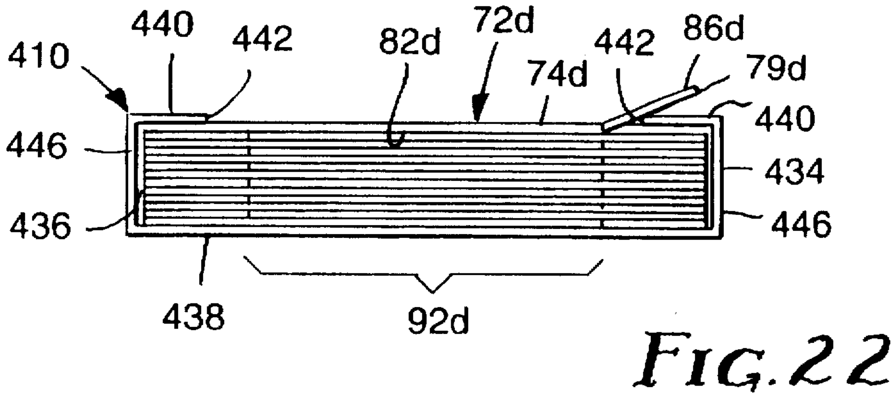
FIG. 22 is a side view of a seventh embodiment of a dispenser package according to the present invention.

FIG. 22 of the drawing illustrates a seventh embodiment 410 of a dispenser package according to the present invention that is very similar to the dispenser package 310 in that it includes a stack 72*d* of sheets 74*d* that is generally the same as the stack 72*d* of sheets 74*d* of the dispenser package 310 described above, it includes an enclosure 434 comprising stiff walls (e.g., of polymeric material or metal) defining a chamber 436 in which the stack 72*d* of sheets 74*d* is positioned, including a bottom wall 338 to an inner surface of which a lowermost sheet 74*d* on the stack 72*d* is adhered or otherwise fixed face to face along its full length, and a top wall including top wall portions 440 opposite the bottom wall 438 with spaced opposed abutment surfaces 442 that are straight and extend transverse to or across the length of the sheets 74*d* generally parallel to the ends 79*d* and 80*d* of the sheets 74*d*. Also, as in the dispenser package 311, the abutment surfaces 442 help define a wide generally central transverse slot having a length between the abutment surfaces 442 that is greater than the length of the centered portions 92*d* of the layers 82*d* of pressure sensitive adhesive, and the walls also include spacing or side walls 446 between the bottom wall 438 and the top wall portions 440 disposed at opposite ends of the bottom wall 438; which side walls 446 provide a space between the top wall portions 440 and the portion of the uppermost sheet 74*d* in the stack 72*d* adhered to the first underlying sheet 74*d* in the stack 72*d* in that the top wall 440 does not restrict free movement of that uppermost sheet 74*d* from beneath it, however, space such as is provided in the dispenser packages 10 and 70 described above is not needed because the slot has a length between the abutment surfaces 442 that is significantly greater than the length of the centered portions 92*d* of the layers 82*d* of pressure sensitive adhesive.

Unlike the dispenser package 311, however, the top wall portions 440 do not project significantly above the stack 72*d* to position the abutment surfaces 442 above it, and thus the uppermost sheet 74*d* on the stack 72*d* is resiliently bent so that its first end portion 86*d* projects through the slot, rests against the adjacent first abutment surface 442 which lays along the top surface of the stack 72*d*, and, because of the relationship between that adjacent abutment surface 342 and the end of the coating of pressure sensitive adhesive 82*d* on the uppermost sheet 74*d*, is disposed adjacent its first end 79*d* at an angle of only about 175 degrees, with respect to the second end portion 90*d* of the uppermost sheet 74*d* that is adhered to the first underlying sheet 74*d* in the stack 72*d*. The dispenser package 410 affords dispensing of sheets 74*d* in the manner described above for the other dispenser packages. The first end 79*d* of one of the sheets 74*d* projecting through the slot is not as easily grasped by a person wishing to withdraw a sheet as are the first ends of the sheets in the dispenser packages described above, however the dispenser package 410 has the advantage of being quite compact.

Figure 23:
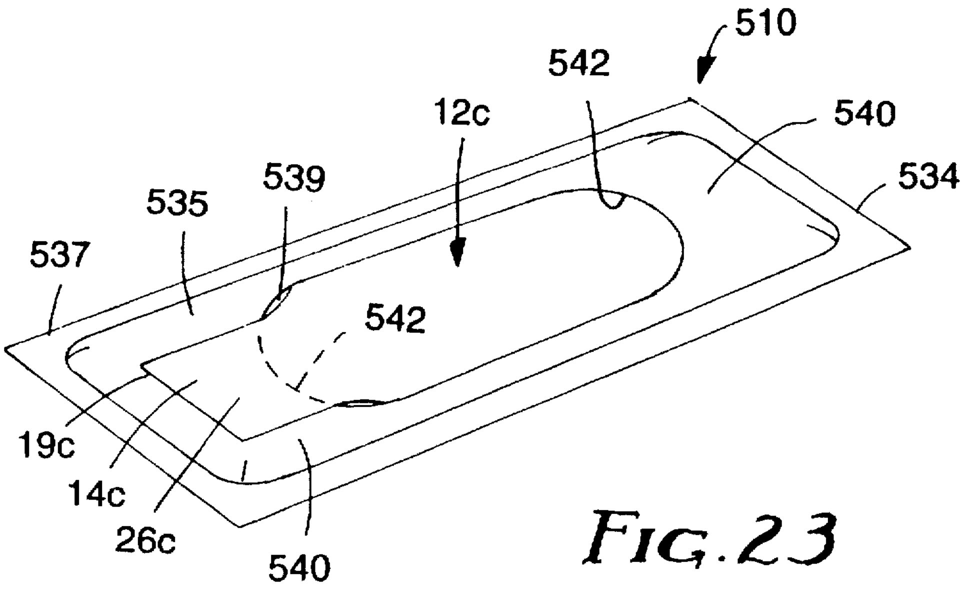
FIG. 23 is a perspective view of a eighth embodiment of a dispenser package according to the present invention.
Figure 24:
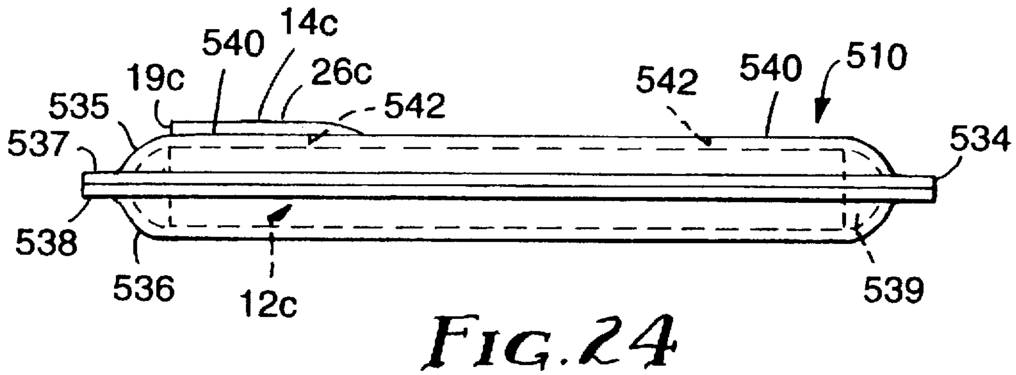
FIG. 24 is a side view of the dispenser package of FIG. 23.

FIGS. 23 and 24 of the drawing illustrate an eighth embodiment 510 of a dispenser package according to the present invention that includes a stack 12*c* of sheets 14*c* that is generally the same as the stack 12 of sheets 14 of the dispenser package 10 described above, and has its parts (some of which are not identified in FIG. 23, but can be understood by referring to the above description of the dispenser package 10) identified with the same reference numerals to which has been added the suffix "c". The dispenser package 510 includes an enclosure 534 formed from two pieces of pasteboard that have each been embossed to provide corresponding central projecting portions 535 and 536 and surrounding flanges 537 and 538. The flanges 537 and 538 are adhered or otherwise attached together with their projecting portions 535 and 536 projecting in opposite directions to define a chamber 539 therebetween. The stack 12*c* of sheets 14*c* is positioned in the chamber 539 with a lowermost sheet 14*c* on the stack 12*c* adhered or otherwise fixed face to face along its full length to a bottom wall defined by the projecting portion 536. The enclosure 534 also includes a top wall opposite its bottom wall defined by the projecting portion 535 and having top wall portions 540 with spaced opposed abutment surfaces 542 that are arcuate or cylindrically concave and extend transverse to or across the length of the sheets 14*c* generally parallel to the ends 19*c* and 20*c* of the sheets 14*c*. The abutment surfaces 542 help define a wide generally central transverse slot having a length between the abutment surfaces 542 that is greater than the length of the centered portions 32*c* of the layers 22*c* of pressure sensitive adhesive, and the walls defined by the projecting portions 535 and 536 also include spacing or side walls between the top and bottom walls that provide a space between the top wall and the portion of the uppermost sheet 14*c* in the stack 12*c* adhered to the first underlying sheet 14*c* in the stack 12*c* in that the top wall portions 540 do not restrict free movement of that uppermost sheet 14*c* from beneath them, however, space such as is provided in the dispenser packages 10 and 70 described above is not needed or provided.

Like the dispenser package 410, the top wall portions 540 do not project above the stack 12*c*. Thus, while the uppermost sheet 14*c* on the stack 12*c* is resiliently bent so that its first end portion 26*c* projects through the slot and rests against the adjacent first abutment surface 542; because of the relationship between that abutment surface 542 and the end of the coating of release material 28*c* on the first underlying sheet 24*c* adjacent the second end of the uppermost sheet 24*c*, that projecting end portion 26*c* is disposed adjacent its first end 19*c* at an angle of only about 275 degrees with respect to the second end portion 20*c* of the uppermost sheet 14*c* that is adhered to the first underlying sheet 14*c* in the stack 12*c*. The dispenser package 510 affords dispensing of sheets 14*c* in the manner described above for the other dispenser packages. The first end 19*c* of one of the sheets projecting through the slot is not as easily grasped by a person wishing to withdraw a sheet as are the first ends of the sheets in many of the dispenser packages described above, however the dispenser package has the advantage of being compact. Also, the outer surfaces of the top wall portions 540 opposite the chamber 536 are coated with a release material adapted so that the first end portion 26*c* of the sheet projecting through the slot may be releasably adhered to the adjacent outer surface to facilitate storage of the dispenser package 510. When one of the sheets 14*c* projecting through the slot is then pressed against the arcuate abutment surface 542 over which it extends as by a persons fingernail or otherwise, the beam strength imparted by thus longitudinally arcing the sheet 14*c* can cause it to separate from that outer surface 540 of the top wall portion 540 and present itself in a position where it may be manually grasped to withdraw it from the dispenser package 510.

The present invention has now been described with reference to several embodiments thereof. It will be apparent to those skilled in the art that many changes can be made in the embodiments described without departing from the scope of the present invention. Thus, the scope of the present invention should not be limited to the structures and methods described in this application, but only by the structures and method described by the language of the claims and the equivalents thereof.

We claim:

1. A pad comprising:

(a) a plurality of superimposed aligned sheets, wherein;

(1) each sheet includes: (A) a backing having top and bottom major surfaces; and (B) a layer of pressure sensitive adhesive on the bottom surface of the backing; and (2) the plurality of superimposed sheets form a unitary pad having (i) a longitudinal length, (ii) a first longitudinal end, (iii) a second longitudinal end, (iv) an uppermost adhesive sheet with an exposed top surface, and (v) a lowermost adhesive sheet with an exposed adhesively coated bottom surface; and (b) a leader strip having a shorter longitudinal length than the pad, a first longitudinal end, and a second longitudinal end; the leader strip superimposed over the exposed top surface of the uppermost adhesive sheet, such that;

(1) a first end portion of the leader strip is positioned proximate the first end of the pad and adhesively bonded to the exposed top surface of the uppermost adhesive sheet, and (2) a second end portion of the leader strip is positioned intermediate the first and second ends of the pad and forms a nontacky, intermediately positioned pull tab with the second end of the leader strip longitudinally offset from the second end of the pad towards the first end of the pad.

2. The pad of claim 1 wherein:

(a) each sheet is adhesively bonded to the top surface of an immediately underlying sheet with a first adhesive strength along a first end portion of the sheet and with a second adhesive strength along a second end portion of the sheet;

(b) the first end portions of each successive sheet in the pad are positioned so that the first end portion of successive sheets alternate between the first and second ends of the pad; and (c) the second adhesive strength is sufficiently less than the first adhesive strength that the second end portion of each sheet will delaminate from the immediately underlying sheet when an immediately overlying sheet is peeled from the pad.

3. The pad of claim 2 wherein the difference in adhesive strength between the first and second end portions of each sheet is achieved by applying a coating of different release materials to the first and second end portions of the top surface of each sheet.

4. The pad of claim 2 wherein the difference in adhesive strength between the first and second end portions of each sheet is achieved by extending the adhesive layer over the first end portion only, whereby the second end portion is free of adhesive.

* * * * *